United States Patent
Antonellis et al.

(10) Patent No.: US 10,453,492 B2
(45) Date of Patent: *Oct. 22, 2019

(54) METHOD AND APPARATUS FOR GENERATING ENCODED CONTENT USING DYNAMICALLY OPTIMIZED CONVERSION FOR 3D MOVIES

(71) Applicant: WARNER BROS. ENTERTAINMENT INC., Burbank, CA (US)

(72) Inventors: Darcy Antonellis, Granada Hills, CA (US); Lewis S. Ostrover, Los Angeles, CA (US); Bradley Thomas Collar, Valencia, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/408,906

(22) Filed: Jan. 18, 2017

(65) Prior Publication Data

US 2017/0125055 A1    May 4, 2017

Related U.S. Application Data

(63) Continuation of application No. 13/205,720, filed on Aug. 9, 2011, now Pat. No. 9,591,374, which is a
(Continued)

(51) Int. Cl.
*H04N 5/92* (2006.01)
*H04N 5/89* (2006.01)
(Continued)

(52) U.S. Cl.
CPC .......... *G11B 27/02* (2013.01); *H04N 9/8233* (2013.01); *H04N 13/156* (2018.05); *H04N 21/4884* (2013.01)

(58) Field of Classification Search
USPC ....... 386/278, 326, 335, 332, 239, 240, 248; 715/757, 782, 836, 848, 850, 852
See application file for complete search history.

(56) References Cited

U.S. PATENT DOCUMENTS

| 5,530,478 A | 6/1996 | Sasaki et al. |
| 5,684,714 A | 11/1997 | Yogeshwar et al. |
| (Continued) | | |

FOREIGN PATENT DOCUMENTS

| WO | 2008/038205 A2 | 4/2008 |
| WO | 2010/022633 | 3/2010 |

OTHER PUBLICATIONS

"High Quality 3D on Blu-ray is Here . . . ", Technicolor.com, the date of publication is not available. Admitted prior art.
(Continued)

*Primary Examiner* — Daquan Zhao
(74) *Attorney, Agent, or Firm* — Gottlieb, Rackman & Reisman, P.C.

(57) ABSTRACT

The present invention pertains to an apparatus and method for adding a graphic element, such as a subtitle to selected locations of the frames in a 3D movie. The authoring tool receives a depth map indicating the position of various objects in the frames of 3D content along a Z-axis. The authoring device then designates a position for at least one additional graphic element in at least some of the frames, these positions being determined in relation either to the positions of the objects or the position of the screen along said Z-axis. An encoder uses parameters from the authoring tool to reauthor the 3D movie by adding the graphic content to the positions designated by the parameters.

18 Claims, 2 Drawing Sheets

Related U.S. Application Data continuation-in-part of application No. 13/173,671, filed on Jun. 30, 2011, now Pat. No. 8,917,774.

(60) Provisional application No. 61/371,901, filed on Aug. 9, 2010, provisional application No. 61/360,088, filed on Jun. 30, 2010.

(51) Int. Cl.

| | | |
|---|---|---|
| *G11B 27/02* | (2006.01) | |
| *H04N 13/156* | (2018.01) | |
| *H04N 9/82* | (2006.01) | |
| *H04N 21/488* | (2011.01) | |
| *H04N 9/80* | (2006.01) | |

(56) References Cited

U.S. PATENT DOCUMENTS

| | | | |
|---|---|---|---|
| 5,990,955 | A | 11/1999 | Koz |
| 6,100,940 | A | 8/2000 | Dieterich |
| 6,466,248 | B1 | 10/2002 | Spann et al. |
| 6,572,475 | B1 | 6/2003 | Okabe et al. |
| 8,290,338 | B2 | 10/2012 | Sasaki et al. |
| 8,306,387 | B2 | 11/2012 | Yamashita et al. |
| 8,363,729 | B1 | 1/2013 | Sha et al. |
| 8,831,255 | B2 | 9/2014 | Crawford et al. |
| 9,299,353 | B2 | 3/2016 | Sole et al. |
| 9,532,158 | B2 | 12/2016 | Lando et al. |
| 9,826,328 | B2 | 11/2017 | Mehta et al. |
| 2001/0021220 | A1 | 9/2001 | Fert et al. |
| 2001/0053281 | A1 | 12/2001 | Kashiwagi et al. |
| 2002/0033845 | A1* | 3/2002 | Elber ............... G06T 17/00 715/764 |
| 2002/0085219 | A1 | 7/2002 | Ramamoorthy |
| 2002/0118756 | A1 | 8/2002 | Nakamura et al. |
| 2003/0007648 | A1 | 1/2003 | Currell |
| 2003/0012275 | A1 | 1/2003 | Boice et al. |
| 2003/0053680 | A1 | 3/2003 | Lin et al. |
| 2003/0086127 | A1 | 5/2003 | Ito et al. |
| 2003/0184453 | A1 | 10/2003 | Hall et al. |
| 2003/0228063 | A1 | 12/2003 | Nakayama et al. |
| 2004/0054721 | A1 | 3/2004 | Pilu et al. |
| 2004/0111171 | A1 | 6/2004 | Jang et al. |
| 2004/0163123 | A1 | 8/2004 | Okada et al. |
| 2005/0146521 | A1 | 7/2005 | Kaye et al. |
| 2005/0160473 | A1 | 7/2005 | Gal-Oz |
| 2006/0072399 | A1 | 4/2006 | Fujimoto et al. |
| 2006/0115092 | A1 | 6/2006 | Toyama et al. |
| 2006/0129909 | A1 | 6/2006 | Butt et al. |
| 2006/0130112 | A1 | 6/2006 | Stewart et al. |
| 2006/0153295 | A1 | 7/2006 | Wang et al. |
| 2006/0159359 | A1 | 7/2006 | Lee |
| 2006/0168632 | A1 | 7/2006 | Honda et al. |
| 2006/0210182 | A1 | 9/2006 | Kimura |
| 2007/0005351 | A1 | 1/2007 | Sathyendra et al. |
| 2007/0071345 | A1 | 3/2007 | Wang |
| 2007/0074266 | A1 | 3/2007 | Raveendran et al. |
| 2007/0094583 | A1 | 4/2007 | Randall et al. |
| 2007/0133675 | A1 | 6/2007 | Honda et al. |
| 2007/0153914 | A1 | 7/2007 | Hannuksela et al. |
| 2007/0230565 | A1 | 10/2007 | Tourapis et al. |
| 2007/0286277 | A1 | 12/2007 | Chen |
| 2008/0025391 | A1 | 1/2008 | Amon et al. |
| 2008/0091845 | A1 | 4/2008 | Mills et al. |
| 2008/0097763 | A1 | 4/2008 | Van De Par et al. |
| 2008/0123754 | A1 | 5/2008 | Ratakonda et al. |
| 2008/0140426 | A1 | 6/2008 | Kim et al. |
| 2008/0242946 | A1 | 10/2008 | Krachman |
| 2009/0154558 | A1 | 6/2009 | Agarwal et al. |
| 2009/0177479 | A1 | 7/2009 | Yoon et al. |
| 2009/0225829 | A2 | 9/2009 | Kwon et al. |
| 2009/0232207 | A1 | 9/2009 | Chen |
| 2009/0237564 | A1 | 9/2009 | Kikinis et al. |
| 2009/0238264 | A1 | 9/2009 | Wittig et al. |
| 2009/0267811 | A1 | 10/2009 | Tsang |
| 2009/0295905 | A1 | 12/2009 | Civanlar et al. |
| 2009/0315980 | A1 | 12/2009 | Jung et al. |
| 2010/0014584 | A1 | 1/2010 | Feder et al. |
| 2010/0023634 | A1 | 1/2010 | Labonte et al. |
| 2010/0061448 | A1 | 3/2010 | Zhou et al. |
| 2010/0070831 | A1 | 3/2010 | Gasanov et al. |
| 2010/0076577 | A1 | 3/2010 | Lee et al. |
| 2010/0092099 | A1 | 4/2010 | Richter |
| 2010/0131817 | A1 | 5/2010 | Kong et al. |
| 2010/0174541 | A1 | 7/2010 | Vos |
| 2010/0195723 | A1 | 8/2010 | Ikai et al. |
| 2010/0215343 | A1* | 8/2010 | Ikeda ............... G11B 27/034 386/241 |
| 2010/0238267 | A1* | 9/2010 | Izzat ............... H04N 13/183 348/43 |
| 2010/0309975 | A1 | 12/2010 | Zhou et al. |
| 2011/0015765 | A1 | 1/2011 | Haughay et al. |
| 2011/0019761 | A1 | 1/2011 | Shimada et al. |
| 2011/0119708 | A1 | 5/2011 | Lee et al. |
| 2011/0122944 | A1 | 5/2011 | Gupta et al. |
| 2011/0164769 | A1 | 7/2011 | Zhan et al. |
| 2011/0200266 | A1 | 8/2011 | Fuchie et al. |
| 2012/0023148 | A1 | 1/2012 | Long et al. |
| 2012/0062700 | A1 | 3/2012 | Antonellis et al. |
| 2013/0181901 | A1 | 7/2013 | West |
| 2016/0260441 | A1 | 9/2016 | Muehlhausen et al. |
| 2017/0078823 | A1 | 3/2017 | Robinson |
| 2017/0287007 | A1 | 10/2017 | Du |

OTHER PUBLICATIONS

International Search Report & Written Opinion dated Jan. 25, 2012 issued in corresponding PCT International Application No. PCT/US11/51321.

KDDI Labs demos 3D virtual sound technology, Diginfo.tv, AkihabaraNews Official Partner.

Extended European Search Report dated Aug. 17, 2016 issued in corresponding EP Application No. 11825762.5.

Canadian Office Action dated Jun. 21, 2017 issued in corresponding Canadian Application No. 2,844,078.

* cited by examiner

METHOD AND APPARATUS FOR GENERATING ENCODED CONTENT USING DYNAMICALLY OPTIMIZED CONVERSION FOR 3D MOVIES

RELATED APPLICATIONS

This application claims priority to U.S. application Ser. No. 13/205,720, which, in turn, claims priority to U.S. provisional application Ser. No. 61/371,901 filed Aug. 9, 2010, and is a continuation-in-part of U.S. application Ser. No. 13/173,671 filed on Jun. 30, 2011, entitled METHOD AND APPARATUS FOR GENERATING ENCODED CONTENT USING DYNAMICALLY OPTIMIZED CONVERSION and claiming priority to U.S. Provisional patent application Ser. No. 61/360,088 filed on Jun. 30, 2010, all applications being incorporated herein by reference in their entirety.

BACKGROUND OF THE INVENTION

A. Field of Invention

This invention pertains to a method and apparatus of enhancing a 3D movie by adding to it new content, such as subtitles, at a particular depth.

B. Description of the Prior Art

In the past, 3D movies or other episodic 3D content were recorded optically on film and then distributed in analog formats. However, advances in digital signal processing make it possible to provide such content in digital formats which have several well-known advantages over the analog formats.

In the present application, the term 'digital 3D movie' is used to refer to 3D movies, episodic content, or other 3D multi-media content recorded, produced and/or converted into a digital format. This includes content produced in 2D and then post-produced from 2D to 3D, as well as rendered from 3D animation systems.

Digital 3D digital movies may be produced by converting the analog content (e.g., content recorded on film or analog video tape) into a desired digital format. Alternatively, digital video cameras are used to generate content in a raw digital format, which is then edited and converted into a format suitable for viewing or distribution. Different venues or distribution channels are used for distributing the digital 3D movie electronically, including:

A. Digital communication channel to movie house for theatrical presentation;
B. Satellite transmission to subscribers, such as DirecTV;
C. Blu-ray Disc;
D. DVD;
E. Various hand-held devices such as Nintendo 3DS® receiving streamed media over a Wi-Fi network or other private or public channels.

Each of these venues requires typically its own format(s). For example, a satellite communication channel for digital projection in a movie theater the digital 3D movie in a JPEG 2000 format.

A Blu-ray 3D Disc normally uses MVC formatted files.
A DVD may require MPEG-2 format files.

Each of these digital 3D movie distribution channels may use different forms of 3D encoding, resolution, compression, and/or authoring. For example, theatrical presentation may require 4K resolution using JPEG2000 compression with 'burned in' subtitles for digital theatrical exhibition. A Blu-ray disc may require an image with 1920×1080 p HD resolution using MVC compression with subtitles presented in a 'one plane+offset' manner for Blu-ray Disc. DirecTV may require a frame compatible spatial compression (e.g. 'side-by-side') and AVC compression with 'burned in' subtitles for DirecTV satellite broadcast. A small, hand held device may require a 800×240 pixel image (400×240 for each eye) resolution using Mobiclip compression with 'burned in' subtitles for Nintendo 3DS autostereo (no glasses required) viewing.

Moreover, as previously mentioned, digital 3D movies in some of the formats may incorporate additional content, e.g., menus, subtitles in one or more languages, etc., using an appropriate authoring process.

Typically, once a digital 3D movie is made and recorded in a raw format, it is converted into a format suitable for a particular distribution channel, such as the channels described above. Depending upon the order in which a digital 3D movie is prepared for distribution, e.g. theatrical, Blu-ray Disc, DVD, satellite broadcast, there may be relevant 3D information determined by encoding or authoring software and/or an operator on a frame by frame, group of frames, or scene by scene basis and recorded in a respective log. For example, a Z-axis depth map of whole frames' content, or of objects of interest within frames, may be determined when preparing to position subtitles or other graphics in 3D space over the background video.

One problem with the existing techniques described above is that they are not used systematically to add new information, such as subtitles and/or other relevant graphics, to an existing 3D movie

SUMMARY OF THE INVENTION

The present invention pertains to an apparatus, including an authoring tool, for adding a graphic element to a 3D movie. The authoring tool receives a depth map indicating the position of various objects in the frames of the 3D movie along a Z-axis. The authoring device then designates a position for additional graphic elements in each frame, these positions being determined in relation either to the positions of the objects or the position of the screen along at least said Z-axis. An encoder uses parameters from the authoring tool to reauthor the 3D content by adding the graphic element at the positions designated by the parameters. The graphic element may include subtitles and other graphic elements.

BRIEF DESCRIPTION OF THE DRAWINGS

FIG. 3 shows a depth map with a first title position for the frame of FIG. 2;
and
FIG. 4 shows a depth map with a second title position for the frame of FIG. 2.

DETAILED DESCRIPTION OF THE INVENTION

The present invention provides a solution for the above-described problem and it operates as follows. More particularly, the present invention presents a system and method for adding subtitles and other relevant graphics to a 3D movie. It should be understood that for the purposes of brevity and clarity, in the following description the term "subtitles" is intended not only standard subtitles (for example, dialogue for a foreign movie) but other relevant graphic content as well.

Figure 1:
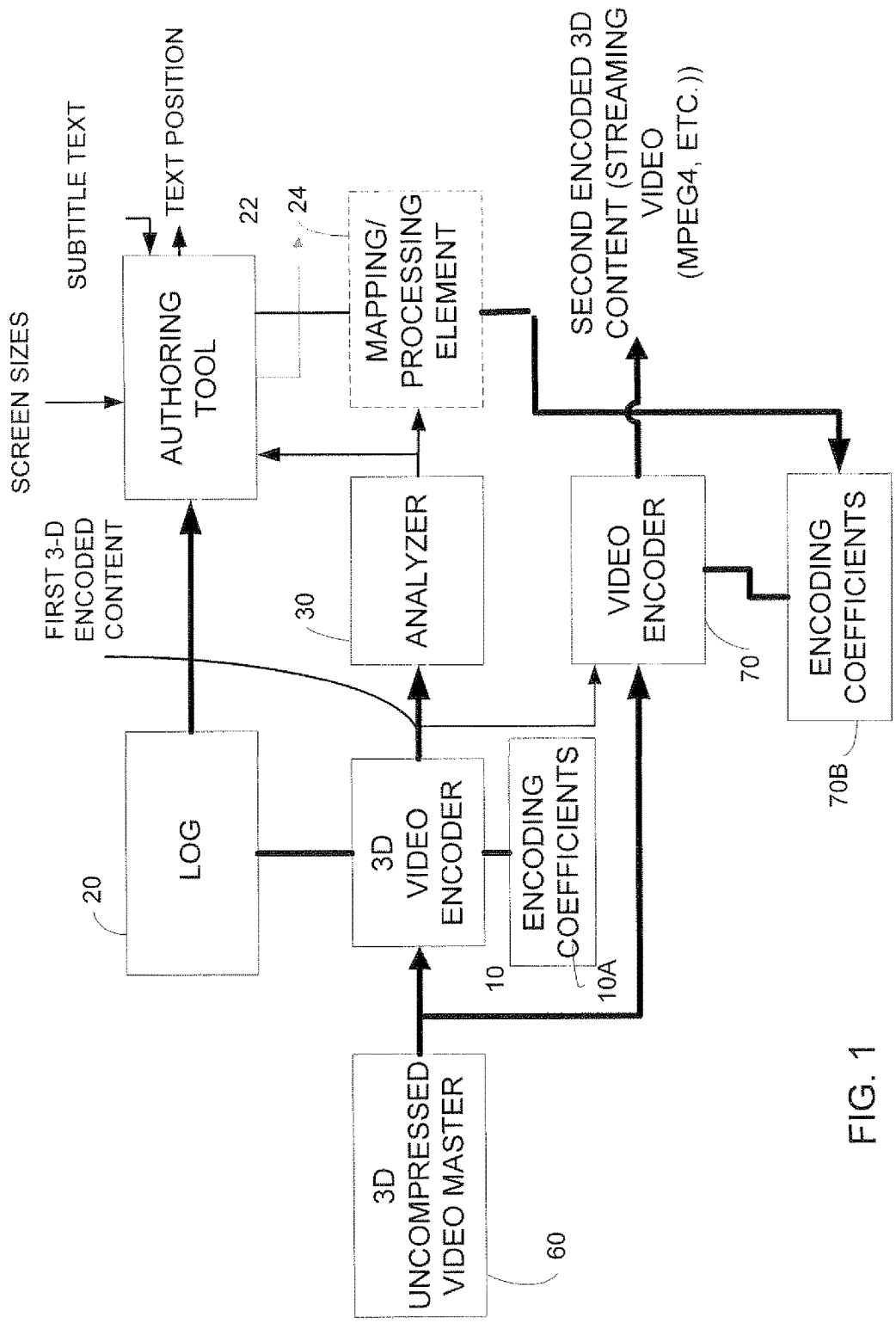
FIG. 1 shows a block diagram of a system constructed in accordance with the present invention.

Referring to the FIG. 1, an uncompressed digital 3D movie 60 is analyzed and encoded by a first 3D video encoder 10 using a first set of encoding coefficients 10A. For example, the digital 3D movie could be in a 1920×1080 p uncompressed image sequence for each left/right eye at the same native resolution as the source material (i.e. 1920×1080 p).

Figure 2:
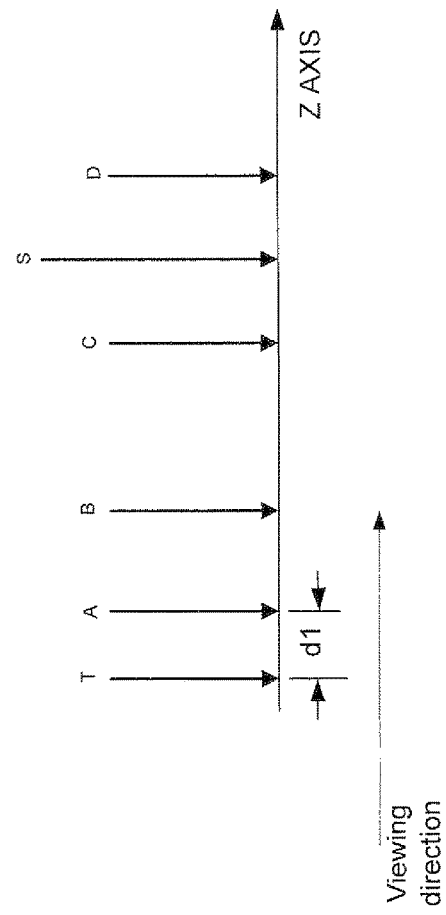
FIG. 2 shows a frame of a scene of a movie captured in 3D.
Figure 2:
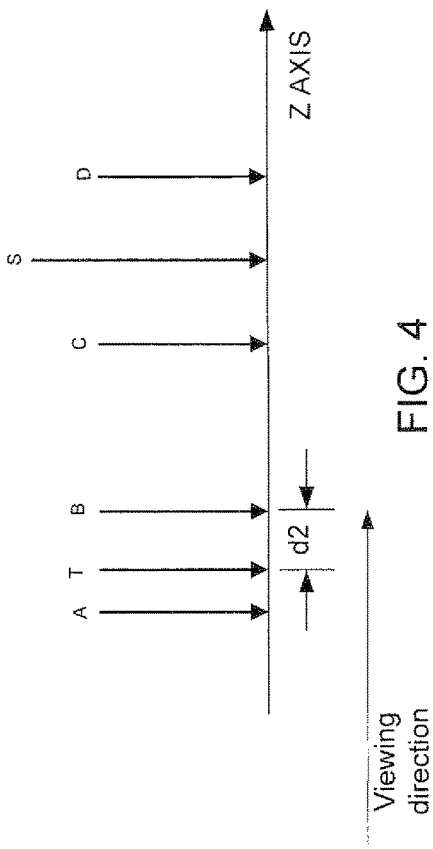
Figure 2:
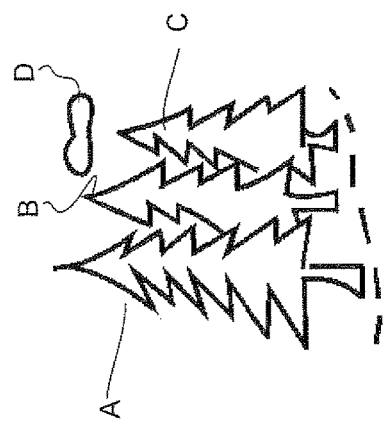

As part of the original analysis, a Z-axis depth map is generated either based on the content of whole frames or based on objects of interest within the frames. For example, as shown in FIG. 2, a frame of scene of a movie captured in 3D may include three trees A, B and C disposed at different distances from the viewer, as well as a cloud D. As part of the encoding process, the encoder generates a Z-axis depth map. This depth map may be generated in various different forms. One typical technique is to generate a gray-scale version of the frame in which each object of interest is assigned a gray scale value dependent on its distance from the viewer. However, for the sake of clarity, the depth map presented in FIG. 3 as a linear axis, with the relative positions of objects of interest being represented by arrows A-D. Arrow S represents the position of the screen.

In one embodiment of the invention, the Z-axis depth map is generated by the encoder 10 and stored in a log 20 together with other compression or encoding parameters generated during the conversion process. The encoder also generates a first 3D encoded content which may be stored, recorded or distributed to customers via various distribution channels. The first 3D encoded content does not have subtitles.

The invention further includes an authoring tool 22 used to add subtitles to the 3D movie. For this purpose, the authoring tool 22 receives the subtitles and title position parameters indicative of where the subtitles should be positioned in the relevant frames. Preferably, subtitles can be positioned in 2D and 3D space with high quality while maintaining 3D viewing comfort. For this reason, not only 2D X and Y positions but also the position of the subtitles in the Z axis is fairly important. Various criteria or approaches can be used to accomplish this goal. Once this position is selected, then the authoring tool analyzes the Z depth map for each frame, allocates the position of the subtitles T and then generates appropriate reauthor control signals for superimposing the subtitles on the 3D frames at the designated location. The following is a partial list of some possible criteria dictating the position of the subtitles on the Z-axis.

a. At a fixed distance d1 in front of the foremost object of interest. For example in FIG. 3, the subtitles are positioned at T disposed at distance d1 in front of tree A.

b. At a fixed distance in front of a particular object, unless, of course, the object or the subtitles are obstructed by other objects. For example, in FIG. 4, the subtitles are positioned at a distance d2 in front of tree B.

c. At a fixed distance from the screen S.

Moreover, the subtitles are positioned by the authoring tool not only along the Z-axis, but also anywhere along the X- and Y-axes. This position can be done either manually or systematically, by taking into consideration the positions of the other objects of interest.

A further consideration in determining the position of subtitles pertains to the actual screen size for which the 3D content is intended for. Generally, 3D content is originally composed and mastered for a specific screen size. However, when content created for one screen size is subsequently prepared, distributed, and viewed on a different screen size some qualitative anomalies can occur, e.g. miniaturization. Therefore when performing subsequent encoding of 3D movies by adding graphic subtitles, it may be desired to optimize the subtitles based on the target screen size. The original stereoscopic content (left/right video image pairs and/or left/right graphic overlay pairs) is fixed in its composition. The only parameter available during the re-encoding or re-authoring process is the horizontal shift, hereafter denoted as "offset," between the left/right video image pairs or left/right graphic overlays.

For the purposes of describing this invention, it is assumed that the original offset corresponding to the original 3D content targeted for an initial screen size is zero. When that same 3D content is to be re-authored for a different target screen size a change in the offset value can be made. The value of the offset is a function of the original screen width (W1), the new target screen width (W2), the interocular distance between the intended viewer's eyes e (e=2.5 inches for average human adult), and the horizontal resolution of the intended screen size (HorRes).

It is presently estimated that $$\text{Offset}=(1-W2/W1)\times e \times (\text{HorRes}/W2)$$

This offset is the total horizontal shift required for the left and right stereoscopic images which will result in a shift of the subtitles along the Z-axis. Preferably, each image should be shifted in the respective direction, and therefore, each image should be shifted by ½ of the offset.

It should be understood that the above formula is a very basic formula and that it could be refined by using additional information that may be available to the authoring tool, including, but not limited to the intended viewer's distance to the screen, maximum 3D disparity desired, original set geometry used when acquiring the 3D content (e.g., distance of each object to camera), original camera parameters used to generate the 3D content (e.g. lens focal length, horizontal offset from optical axis), etc.

Returning to FIG. 1, the depth map and other information is received from the log 20 by the authoring tool 22. The authoring tool also receives the subtitle text and text positioning information (unless it is already preprogrammed in the authoring tool). If it is desired to tailor the position of the subtitles along the Z-axis to compensate for the intended screen size, then the authoring tool also receives the original screen size, the intended screen size and other information necessary for the shift along the Z-axis.

The authoring tool then generates a new set of parameters 23 for creating a second encoded 3D content.

A second encoder 70 (or the original encoder 10) receives either the original 3D uncompressed video master 60 or the first encoded content 12 and, using a second set of encoding coefficients 70B to generate a second 3D encoded content with subtitles. This second encoded content is distributed by standard distribution.

In an alternate embodiment, the authoring tool generates encoding coefficients 70B defining the position(s) of the subtitles and the text for the subtitles are then provided to the encoder 70.

The second set of coefficients 70B may include an original set of predetermined parameters, and/or some or all of the first encoding coefficients 10A, and/or other parameters derived by the first encoder and stored in the log 20. Importantly, the second set of coefficients 70B also includes the parameters from the authoring tool 22 for superimposing the subtitles as discussed above.

Depending on the actual devices used as encoders 10 or 60, the parameters from the authorizing device may not be directly compatible with the encoder 70. In this case, the parameters 23 are fed to a mapping/processing element 24 for mapping the parameter into corresponding coefficients.

The parameters from the authoring tool (22) place the subtitles in the appropriate planes in 3D space for the specific release channel(s) at issue, e.g. Blu-ray Disc, or satellite broadcast, or Nintendo 3DS distribution.

The authoring tool is preferably one such as Sonic Solutions' Scenarist that has controls to set or calculate where to position the subtitles or other relevant graphics over the background video in 3D space using the depth map info depending upon the intended distribution channel.

In the embodiment described above, the depth map and other information derived from the log 20 is used to generate the parameters. Alternatively, if the log is not available, either the first 3D encoded content 12 or the 3D uncompressed video master 60 is analyzed by a separate analyzer to derive the information required by the authoring tool 22 and the optional mapping/processing element 24.

In any case, the subtitles can be positioned in the X, Y and Z 3D space, either using one set of pre-set parameters for the entire duration of the video content, or dynamic positioning can be managed by setting different parameters for different scenes (or other relevant groups of frames), or manual positioning can be used to override pre-set parameters in exceptional cases. For example, prior to assigning a position for a title for a given scene, the apparent distance between relevant objects and the viewer is monitored during the scene and the shortest distance is determined. The position for the subtitle is set for that scene to be a predetermined, e.g., 2%, less than this shortest distance.

In this manner, video frames with subtitles or other relevant graphics are efficiently processed dynamically using the depth map obtained from the log of an original encoder or from a separate analyzer.

Numerous modifications may be made to the invention without departing from its scope as defined in the appended claims.

The invention claimed is:

1. An apparatus for adding additional graphic content including subtitles to a 3D-movie configured to be presented on a first screen of a first size, the 3D-movie formed of a group of frames, each frame including objects having coordinates at least in the Z-direction, the apparatus comprising:
   a user interface adapted to receive from a user a designation of additional graphic content and placement information defining relative positions of said additional graphic content at least in the Z-direction selected for at least some of the frames of a plurality of frames with respect to at least one of said objects within the respective frames; and
   an encoder configured to receive first encoded 3D content comprising the 3D-movie including the additional graphic content and first relative offsets of said additional graphic content in left and right frames selected for display of the 3D-movie on the screen of the first size, the encoder further configured to generate from the first encoded 3D content a second encoded 3D content including said additional graphic content at the Z-positions designated by said placement information and having second relative offsets selected to configure said second encoded 3D content for presentation on a second screen having a different size than the first size.

2. The apparatus of claim 1 further comprising an initial encoder receiving the 3D movie and encoding said 3D movie to generate the first encoded 3D content configured for the first screen, said initial encoder generating a depth map during said encoding for positioning the additional content in the Z-direction.

3. The apparatus of claim 1 further comprising an analyzer receiving the 3D movie and analyzing said 3D movie to generate a depth map for positioning the additional content in the Z-direction.

4. The apparatus of claim 1 wherein said map includes original information defining the positions of said objects in the X-, Y- and Z-directions and wherein said graphic elements are placed by said encoder at designated positions in relation to said objects in accordance with said placement information, said designated positions being defined by coordinates in the X, Y and Z directions.

5. The apparatus of claim 1 wherein said 3D movie has a duration and said encoder sets said position with said parameters for said entire duration.

6. The apparatus of claim 1 wherein said 3D movie includes several scenes and said encoder sets said position for each scene.

7. The apparatus of claim 6 wherein said encoder sets said position based on a smallest apparent distance between objects of interest and the viewer during a scene.

8. The apparatus of claim 7 wherein said subtitles includes a left and a right component to be viewed with the left and right eye, respectively, and wherein said left and right components are shifted horizontally in opposite directions by the encoder to create an apparent shift along the Z-axis to compensate for the difference between the first size and the second size.

9. The apparatus of claim 1 wherein said Z-position is determined based on at least one of (a) a fixed distance in front of a foremost object in a respective frame; (b) a fixed distance in front of a preselected object within a respective frame; and (c) a fixed distance in front of the screen.

10. The apparatus of claim 1 wherein said Z-position is determined as a fixed distance in front of a foremost object in a respective frame.

11. The apparatus of claim 1 wherein said Z-position is determined as a fixed distance in front of a preselected object within a respective frame.

12. The apparatus of claim 1 wherein said Z-position is determined as a fixed distance in front of the screen.

13. A method for generating an encoded 3D movie comprising:
   receiving a video master, said video master including several scenes and being configured for presentation on a first screen having a first size;
   analyzing said video master to determine the location of objects along the Z-axis in each scene;
   inserting a graphic element dynamically in said scenes, said graphic element being disposed at a Z axis position at a predetermined distance greater than zero at least along the Z axis in front of the location of one of said objects;
   encoding said video master and inserted graphic element to generate a first encoded 3D content for presentation on a screen, said graphic element being positioned at said predetermined distance; and
   in response to a determination that said 3D movie is to be presented on a screen having a second size different from said first size processing the first encoded version of said 3D content to produce a second encoded version of said 3D content, the processing of the first encoded version including adjusting the Z axis position of said graphic element based on said second size.

14. The method of claim 13, wherein said encoding includes generating a depth map for each object of interest, wherein said graphic element is inserted using said depth map.

15. The method of claim 13 further comprising determining which is the foremost object of interest in a scene and disposing said graphic element in front of said foremost object.

16. The method of claim 13 wherein said encoding is performed using a set of encoding coefficients.

17. The method of claim 13 wherein at least one of said encoding coefficients is derived based on said positional information.

18. The method of claim 13 wherein said predetermined distance in the Z-direction is determined based at least one of (a) a fixed distance in front of a foremost object in a respective frame; (b) a fixed distance in front of a preselected object within a respective frame; and (c) a fixed distance in front of the screen.

* * * * *